(12) United States Patent
Weibel

(10) Patent No.: US 6,251,458 B1
(45) Date of Patent: Jun. 26, 2001

(54) USE OF STRUCTURALLY EXPANDED CELLULOSE TO ENHANCE THE SOFTNESS AND RETARD STALING OF BAKED PRODUCTS

(76) Inventor: Michael K. Weibel, 120 Gallows Hill Rd.., West Redding, CT (US) 06896

( * ) Notice: Subject to any disclaimer, the term of this patent is extended or adjusted under 35 U.S.C. 154(b) by 0 days.

(21) Appl. No.: 09/509,136

(22) PCT Filed: Sep. 23, 1998

(86) PCT No.: PCT/US98/19868

§ 371 Date: Mar. 22, 2000

§ 102(e) Date: Mar. 22, 2000

(87) PCT Pub. No.: WO99/15021

PCT Pub. Date: Apr. 1, 1999

Related U.S. Application Data

(60) Provisional application No. 60/061,136, filed on Oct. 6, 1997, provisional application No. 60/059,645, filed on Sep. 24, 1997, and provisional application No. 60/059,791, filed on Sep. 23, 1997.

(51) Int. Cl.$^7$ ................................................. A21D 13/00
(52) U.S. Cl. .................... 426/321; 426/531; 426/549; 426/653; 426/658; 426/622
(58) Field of Search .................... 426/321, 549, 426/531, 653, 658, 622

(56) References Cited

U.S. PATENT DOCUMENTS

| | | | |
|---|---|---|---|
| 4,395,426 | * | 7/1983 | Fan .......................................... 426/62 |
| 4,761,203 | * | 8/1988 | Vinson ...................................... 162/9 |
| 5,993,883 | * | 11/1999 | Lindsley ................................ 426/555 |

OTHER PUBLICATIONS

International Food Marketing and Technology, Foodline Accession No.: 367096; Dec. 14, 1994 [Abstract].

* cited by examiner

Primary Examiner—Nina Bhat
(74) Attorney, Agent, or Firm—Dan Dorfman Herrell and Skillman, P.C.

(57) ABSTRACT

A method is disclosed to enhance the softness of baked products and retard staling. The method is based on the use of structurally expanded cellulose which is incorporated into the dough during mixing to increase the water absorption of the dough without imparting stickiness. The ability to supersaturate the dough without detrimental impact on processability results in softer character and better grain of the baked product. These properties are maintained over time resulting in reduced staling and superior quality of sliced product.

5 Claims, 1 Drawing Sheet

USE OF STRUCTURALLY EXPANDED CELLULOSE TO ENHANCE THE SOFTNESS AND RETARD STALING OF BAKED PRODUCTS

This application claims benefit under 35 U.S.C. 371 National Stage Application based on PCT/US98/19868, filed Sep. 23, 1998 which also claims benefit under 35 U.S.C. 119(e) of No. 60/059,791 filed Sep. 23, 1997 which claims benefit of No. 60/059,645, filed Sep. 24, 1997 which claims benefit of No. 60/061,136 filed Oct. 6, 1997.

BACKGROUND OF THE INVENTION

The commercial baking industry has long sought additives which improve softness and prevent staling of baked products. The ordinary consumer equates softness with freshness and any change in a baked product during storage which develops firmer texture is viewed as undesirable. Such change is, however, inevitable as time dependent effects which are largely associated with the starch component of flour begin to occur immediately after baking. This staling phenomenon ultimately restricts the lifetime of a baked product prior to use and has major impact on the economics associated with sales and distribution.

While much study has been devoted to staling of baked products, and much progress has been made in the understanding of the process, there are still many unanswered questions regarding the staling mechanism. Flour contains predominantly two complex macromolecular structures—gluten and starch fraction. Each contributes both functional and nutritional aspects to baked products. Gluten is believed to be more dominant with respect to formation and stabilization of the developing gas cell structure, while starch is believed to be important in water absorption and stabilization of the skeletal cellular network that remains after the baking cycle. Mechanically developed gluten (produced during dough mixing) consists of a microscopically stranded network of thread like structures surrounding a discontinuous phase of dispersed starch granules. During the fermentation stage microscopic gas pockets nucleate and are stabilized by the continuous phase comprised of the gluten starch network. Ultimately a dispersed foam structure is formed. On baking the gluten is denatured and the starch is gelatinized about a thermally expanding gas cell to form a stable film compartmentalizing the dispersed gas cells. After baking the film begins to harden as the two principal starch components, amylose and amylopectin, begin to pass through their respective glass transition temperature ranges. The final baked product is best described as a microscopically networked sponge. Over time, profound physical changes begin to occur largely due to moisture migration from the central interior toward the periphery of the baked dough piece and oligomeric restructuring of the amylopectin and amylose starch components. Some ordering of the now partially denatured gluten structure may also begin to occur.

There are three recognized ways to enhance softness and abate staling. Each has some limitation. Firstly, it has been found that alpha monoglycerides of C-16 and C-18 fatty acids (particularly glycerol monosterate, GMS) are very effective in the prevention of retrogradation (crystal formation) of the amylose fraction. Amylose forms strong helical clathrate structures about GMS which prevents or interrupts substantial crystalline domains from forming with this high molecular weight alpha 1–4 linear glucan. This is largely a one time fix as the effect is immediate after baking when there is still some mobility for the amylose chains to configurationally encase the GMS. There is a limit to the effectiveness of GMS, as the available sites for clathrate formation are rapidly saturated as retrogradation to form GMS inaccessible crystalline domains is kinetically competitive.

The second recognized means of abating staling is the use of amylolytic enzymes. There are at least three important mechanisms of enzyme action which can occur during or after the baking cycle, depending on the heat stability of the enzyme type in question. Alpha amylases are complex enzyme mixtures usually containing several alpha 1–4 glucan hydrolase activities. They basically catalyze the random hydrolysis of long chain starch segments, breaking the chain endolytically to effect depolymerization. They are particularly effective on the linear amylose chains and extended linear segments of the branched amylopectin fraction. In both cases the ability to retrograde and form intermolecular crystalline regions is abated by depolymerization to shorter chain length and generation of a less interactive species designated dextrins. Alpha amylases are broadly classified by their microbial source and characterized by their thermal stability. Fungal alpha amylases are typically thermally labile and are inactivated by the temperatures achieved during the baking cycle. Bacterial alpha amylases are more thermally stable and can largely survive the baking cycle. This can be a problem if their concentration is too high as the residual activity after baking can lead to "gummy" baked products due to continued and excessive starch hydrolysis. In general there is a limit to the use of amylolytic enzymes as too much activity leads to sticky doughs or later a gummy baked product. A second class of amylolytic enzyme is designated glucoamylase. This enzyme operates on starch and dextrins in an exolytic fashion to hydrolytically cleave the pendent glucose moiety sequentially along the alpha 1–4 glucan chain starting at the reducing sugar end. This activity may be present in commercial alpha amylase products. It is not a major contributor to amylase function but can control dextrin accumulation which contributes to sticky doughs. It is thermally labile and inactivated by the baking process. A third class of amylotic enzymes is designated beta amylase or maltogenic amylase. These enzymes, like glucoamylase, are exoactive cleaving the disaccharide maltose sequentially from the reducing end of the polysaccharide chain. Amylose is ultimately converted to maltose, a readily fermented carbohydrate by yeast. Amylopectin is converted to a species denoted as a beta limit dextrin. Beta amylases cannot proceed beyond the 1–6 branch point found in amylopectin, hence the potentially intermolecular interactive alpha amylose chains which extend from the highly branched amylopectin structure are selectively degraded to maltose. Beta amylases are usually of fungal or vegetable origin and are inactivated during the baking cycle.

The third means of softening bread and hence delaying staling is simply to add more water to the dough. While much of the water absorption is intimately associated with the starch granules present in the starch component of wheat flour, excess water which serves as a mediator of moisture depletion in the baked dough piece is largely controlled by the gluten fraction. Again there is a limit to water incorporation as the dough ultimately becomes sticky and cannot be processed by automated equipment. Typically white bread doughs range from 55 to 65~ absorption on flour; however, variety breads and specialty diet bread doughs can have less or more absorption, respectively.

The use of cellulose in bread and other baked products is not entirely new. Powdered and ground cellulosic substances have been used for the production of low or reduced calorie products for over thirty years. These forms of cellulose, however, constitute nutritionally unavailable carbohydrate that functions as an inert bulking agent replacing flour. The levels of cellulose incorporated, based on flour, are relatively high, ranging from 15 to 25%. At these high levels of flour dilution, additional gluten is required for dough performance. Moisture content in diet breads is somewhat elevated due to higher water absorption by the cellulose particles versus flour. However the additional moisture is intimately associated with hydration of the cellulose particle domains and not available to the surrounding continuous starch/gluten matrix. The incorporation of large amounts of ordinary refined cellulose into a reduced calorie bread does not impart any significant anti-staling or extraordinary softening effect. Insofar as is known, it has not previously been proposed to add cellulose to baked products as a means to improve softness or prevent staling.

SUMMARY OF THE INVENTION

It has now been found that structurally expanded celluloses can interact with developed doughs to incorporate significant increments of water above that which would be limiting in the absence of addition of the structurally expanded cellulosic matrix. The result is a softer product and increased yield. Another benefit is that these products display a tighter and more uniform grain which is desirable for sliced products. It is believed that the microfibrillated structure of the cellulose interacts with the microstructure of the gluten fibril network to enhance water immobilization within the developed dough. This allows increased absorption in the developed dough without stickiness and leads to higher water content in the baked dough piece. This additional water results in elevated moisture levels throughout the finished baked product. These effects abate migration and depletion of moisture which is believed to be a major factor in the staling process. There may also be physical participation of the structurally expanded cellulose in the abatement of the gelatinized starch retrogradation process, particularly at the level of the cellulose microfibril.

DETAILED DESCRIPTION OF THE INVENTION

Figure 1:
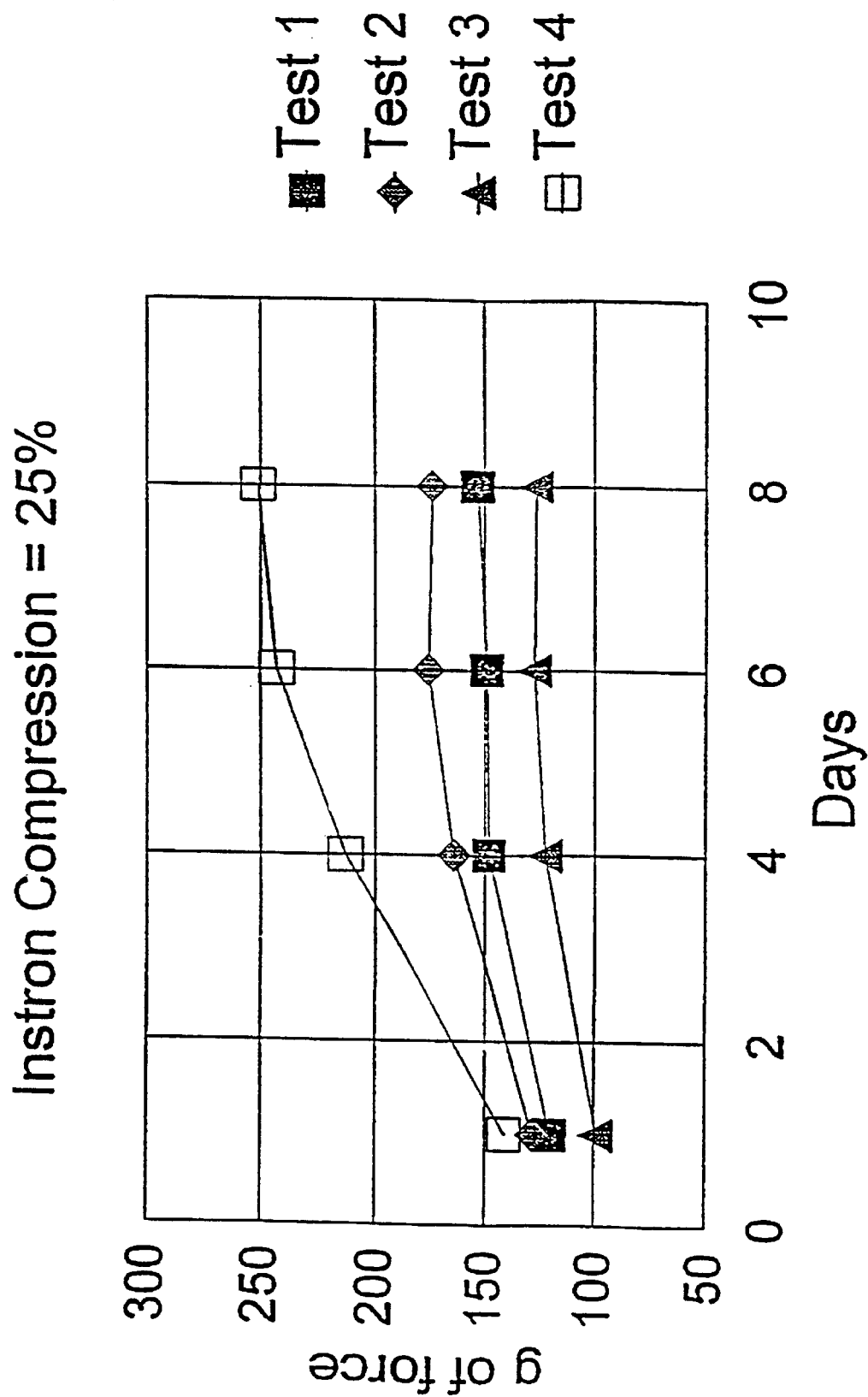
FIGURE 1, the sole drawing FIGURE shows the results of softness test evaluations for four test breads up to 8 days after baking.

The use of structurally expanded cellulose in baked products if novel. The use level, based on flour, is on the order of 500 to 1000 ppm (0.05 to 0.1% w/w) or in the range of 2 orders of magnitude less than that of powdered celluloses in reduced calorie baked products. A typical absorption increase for a bread dough is 2–4%, based on flour, or 40 to 400 fold on structurally expanded cellulose basis. Because structurally expanded cellulose, as used in the practice of this invention, displays vastly different properties from other forms of cellulose, differentiation of structurally expanded cellulose from ordinary powdered, refined cellulose is elaborated below.

In chemical terms cellulose specifically designates a class of plant derived linear glucose homopolysaccharides with beta 1–4 glycosyl linkage. It is the dominant structural polysaccharide found in plants and hence the most abundant polymer known. The function of cellulose is to provide the structural basis for the supramolecular ensemble forming the primary wall of the plant cell. Differentiation and aggregation at the cellular level are highly correlated with cellulose biosynthesis and assembly. In combination with associated proteins, lignin and heteropolysaccharides such as pectin and hemicelluloses, the cellulosic containing primary cell wall defines the shape and spatial dimensions of the plant cell. Therefore cellulose is intimately involved in tissue and organelle specialization associated with plant derived matter. Over time the term "cellulose substance" or simply "cellulose" has evolved as a common commercial describer for numerous non-vegetative plant derived substances whose only commonality is that they contain large amounts of beta 1–4 linked glucan. Commercially, combinations of mechanical, hydrothermal and chemical processing have been employed to enrich or refine the beta 1–4 glucan content to various degrees for specific purposes. However, only highly refined celluloses are useful substrates for structural expansion. Examples of highly refined celluloses are those employed as chemical grade pulps derived from wood or cotton linters. Other refined celluloses are paper grade pulps and products used in food. The latter are typically derived from non-woody plant tissues such as stems, stalks and seed hulls.

Refined cellulose can be considered a supramolecular structure. At the primary level of structure is the beta 1–4 glucan chain. All cellulose is similar at this level. Manipulation at this level would by necessity involve chemical modification such as hydrolysis or substitution on the glycosyl moiety. However, as discussed below this level of structure does not exist as an isolated state in other than special solvent systems which are able to compete with extremely favorable intermolecular association energies formed between beta 1–4 glucan chains.

In contrast to primary structure, a stable secondary level of structure is formed from the nascent beta 1–4 glucan chains which spontaneously assemble into rodlike arrays or threads, which are designated as microfibrils. The number of chains involved are believed to vary from 20 to 100. The dimension of the microfibril is under the control of genetic expression and hence cellulose differentiation begins at this level. Pure mechanical manipulation is not normally practiced at this level of organization. However, reversible chemical modification is the basis for commercial production of reconstituted forms of cellulose fibers such as rayon. Chemical substitution by alkylation of the glycosyl moiety yields stable ether substituted beta 1–4 glycans which no longer self assemble. This reaction forms the basis for the production of commercial forms of cellulose ethers such as carboxymethyl cellulose (CMC), hydroxyethyl cellulose (HEC), hydroxypropyl cellulose (HPC) and methyl or ethyl cellulose (MC & EC). One further modification at the secondary structural level involves intensive acid hydrolysis followed by application of high shear to produce colloidal forms of microcrystalline cellulose (MCC). This modification is best deferred to the next level of structure as most forms of MCC are partially degraded microfibril aggregates.

The third level of cellulose structure is that produced by the assemblage of microfibrils into arrays and ribbon-like structures to form the primary cell wall. As in the case of secondary structure, tertiary structure is under genetic control but additionally reflects cellular differentiation. It is at this level that other structural polymeric and oligomeric entities such as lignin and proteins are incorporated into the evolving structure. Selective hydrolytic depolymerization and removal of the noncellulose components combined with application of sufficient shear results in individually dispersed cellular shells consisting of the cellulosic skeletal matrix. With the removal of strong chemically and physically associated polymeric moieties which strengthen the cellulose motif, structural expansion by mechanical translation and translocation of substructural elements of cellulose can begin to occur.

The process by which structural expansion occurs is that of rapid anisotropic application of mechanical shear to a dispersed phase. Particles of refined cellulose, consisting of cellular fragments, individual cells or aggregates of a few cells, are dispersed in a liquid. The continuous liquid phase serves as the energy transduction medium and excess enthalpy reservoir. While the individual forces maintaining secondary and tertiary structure of the refined cellulose particles are largely noncovalent and hence of relatively low energy, the domains of collective ensembles of such interactions possess extraordinary configurational stability due to the large number of interactions. Only by application of intense hydraulic gradients across a few microns and on a time scale that precludes or minimizes relaxation to mere translational capture, can sufficient energy be focused on segments of the refined cell wall to achieve disassembly of tertiary and secondary structure. In practice a small fraction of the applied energy is captured by structural expansion of the dispersed phase. The vast majority of useful energy is lost into enthalpy of the continuous phase and can complicate processing due to high temperature excursions. As disassembly progresses and the structures become smaller and selectively more internally ordered, disassembly rates diminish rapidly and the process becomes self limiting.

Three general processes are known in the art of cellulose manipulation to provide structurally expanded celluloses useful for practicing this invention. The simplest is structural modification from intense shear resulting from high velocity rotating surfaces such as a disk refiner or specialized colloid mill, as described in U.S. Pat. No. 5,385,640. A second process is that associated with high impact discharge such as that which occurs in high pressure homogenization devices, such as the Gaulin homogenizer described in U.S. Pat. No. 4,374,702. The third process is that of high speed, wet micromilling whereby intense shear is generated at the collision interface between translationally accelerated particles as described in U.S. Pat. No. 4,761,203. It would be expected that anyone skilled in the art could apply one or combinations of the last-mentioned three processes to achieve structurally expanded forms of cellulose useful in the practice of this invention. The disclosures of U.S. Pat. Nos. 5,385,640, 4,374,702 and 4,761,203 are incorporated by reference in the present specification, as if set forth herein in full.

Two other commercial modifications are commonly employed at this structural level and are mentioned to distinguish the resulting product from SECs. The first is a widely practiced approach which involves indiscriminate fragmentation by various dry grinding methods to produce powdered celluloses. Such processes typically result in production of multimicron dimensional particles as intraparticle fragmentation and interparticle fusion rates become competitive in the low micron powder particle size region. Typical powdered celluloses contain particle size distributions ranging from about 5 to 500 microns in major dimension and may be highly asymmetric in shape. These products are employed as anticaking or flow improvement additives for ground and comminuted forms of cheese. The second process involves strong acid hydrolysis followed by moderate dispersive shear producing colloidal microcrystalline cellulose (MCC). It is believed that certain less ordered regions comprising tertiary structure are more susceptible to hydrolytic depolymerization than highly ordered domains resulting in shear susceptible fracture planes. Dispersed forms of MCC are needlelike structures roughly three orders of magnitude smaller than powdered celluloses and range from about 5 nanometers in width to about 500 nanometers in longitudinal dimension. On spray drying MCC aggregates to form hard irregular clusters of microcrystals whose particle dimensions range from 1 to 100 microns. The resulting MCC clusters can serve as a precursor for a unique SEC best described as a microscopic "puff ball" reported in U.S. Pat. No. 5,011,701 and is reported to be a fat mimetic. MCC also finds application as a rheology control agent in processed cheese products.

In contrast to mechanical disassembly of preformed secondary and tertiary structure of refined cellulose from plants, bacterial derived extracellular beta 1,4 glucans self assemble into microfibriller ensemblies and never reach a tertiary structural level. These materials can be isolated from fermentation and perform similarly to mechanically disassembled cellulose upon hydration and dispersion. For purposes of this invention, bacterially derived cellulose is incorporated by reference into the general category of structurally expanded cellulose.

Finally, the quaternary or final structural level of cellulose is that of the cellular aggregate and is mentioned only for completeness. These substances may be highly lignified such as woody tissue or relatively nonlignified such as those derived from the structural stalks and seed hulls of cereal grain plants. Commercial types of these materials are basically dried forms of nonvegetative plant tissue. These moderately elastic substances respond to mechanical processing by deformation and ultimate fracture along the principal deformation vector. Consequently, these materials readily undergo macroscopic and microscopic size reduction and are reduced to flowable powders by conventional cutting, grinding or debridement equipment. Because of the cohensive strength of the molecular ensemble comprising quaternary structure, these materials are not candidates for systematic structural expansion at the submicron level without chemical intervention.

Structural expansion as defined herein is a process practiced on refined celluloses involving mechanical manipulation to disassemble secondary and tertiary cellulose structure. The ultimate level of expansion would be to unravel the cell wall into individual microfibrils. Although plant specific, a typical microfibril is best described as a parallel array of 25 to 100 beta 1,4 glucan chains with diameter in the 50 nanometer range and variable length ranging from submicron to micron multiples. In practice, generation of a dispersed microfibril population is not a realistic objective and only of academic interest. What is usually achieved because of the relatively indiscriminate application of mechanical energy is a highly heterogeneous population of miniature fibrils, ribbon like and slab like structures. These structures display irregular distention of individual microfibrils and aggregates of microfibrils from their surfaces and at internal and external discontinuities. The ensuing collage consists of an entangled and entwined network of cell wall detritus to form a particle gel. Some of the larger structural features with dimensions in the micron range are discernable with the light microscope, however, higher resolution techniques such as scanning transmission electron microscopy are necessary for detailed observation of submicron features. This particle gel network exhibits a vast increase in surface area associated with the volumetric expansion and projection of cell wall structure into the continuous phase medium.

Lastly, structurally expanded celluloses useful for purposes of this invention may be further characterized by possessing a water retention value greater than 350 and a settled volume of at least 50% for a 0.5% percent by weight dispersion of the structurally expanded cellulose in aqueous media.

The following examples are illustrative of practice of the invention but are not intended to limit the scope of the invention.

EXAMPLE 1

Four white, pan bread test doughs with the formulas set forth in Table 1 were produced and baked on a commercial scale bread line. The amounts of ingredients used were in pounds, unless otherwise indicated. The make up was a standard two stage sponge and dough. The sponge was mixed one minute at low speed and four minutes at high speed (1+4) and developed at 74° F. The doughside ingredients were then combined with the sponge (except salt) and mixed at low and high speeds (1+41/2). The salt was added and the dough again subjected to low and high speed mixing (1+41/2). The final temperature of the dough was 78° F. and it was given a floor time of 10 minutes prior to dividing and sheeting. The panned dough pieces were proofed to optimum and baked. The baked breads were bagged without slicing for Instron evaluation.

TABLE 1

|  | Test 1 | Test 2 | Test 3 | Test 4 |
| --- | --- | --- | --- | --- |
| Sponge |  |  |  |  |
| White flour | 800.0 | 800.0 | 800.0 | 800.0 |
| Water | 445.0 | 445.0 | 445.0 | 445.0 |
| Yeast | 38.0 | 38.0 | 38.0 | 38.0 |
| Conditioner | 5.5 | 5.5 | 5.5 | 5.5 |
| Softener | 5.5 | 5.5 | 5.5 | 5.5 |
| Dough |  |  |  |  |
| White flour | 300.0 | 300.0 | 300.0 | 300.0 |
| Water | 180.0 | 180.0 | 205.0 | 180.0 |
| Liquid sugar | 90.0 | 90.0 | 90.0 | 90.0 |
| Shortening | 28.0 | 28.0 | 28.0 | 28.0 |
| Salt | 20.0 | 20.0 | 20.0 | 20.0 |
| †NFDM solids | 17.0 | 17.0 | 17.0 | 17.0 |
| Conditioner | 5.5 | 5.5 | 5.5 | 5.5 |
| *Oven Spring ™ | 3 pkg | 3 pkg | 3 pkg | 3 pkg |
| *Ultracel ™ 3200 HV | — | — | 0.7 | — |
| *Stay Soft 250 | 8 pkg | — | 8 pkg | — |
| *Stay Soft 260 | 8 pkg | — | 8 pkg | — |

†Non-fat dried milk
*Denotes proprietary products manufactured by Watson Foods Company, Inc., West Haven, Connecticut (WFC). Oven Spring ™ is an oxidizer (bromate replacer) system sold in 1 oz. water soluble packets (Solupak ™)

Ultracel™ 3200 HV is a structurally expanded form of cellulose manufactured by WFC. Stay Soft 250 is a proprietary enzyme complex, largely maltogenic amylase activities, produced in a 5 gram Solupak™ by WFC. Stay Soft 2600 is a proprietary enzyme complex, largely alpha amylase activities, produced in a 5 gram Solupak™ by WFC.

The test series was designed to isolate the contribution of enzyme addition and additional water (absorption) over the control bread (Test 4) containing 0.5% distilled mono- and diglycerides based on bakers percentage (flour 100%). The standard absorption was nominally 60%, based on flour accounting for water from yeast and liquid sugar in the control and Tests 1 and 2 and had been carefully optimized.

Addition of 1 ounce/hundred weight (cwt) flour in Test 3 allowed incorporation of an additional 25 lbs of water into the dough, or 2.3% additional absorption based on flour. Addition of this incremental level of water to the control dough gave a "sticky" dough that was difficult to remove from the mixer and could not be processed by the high speed divider/rounder or sheeter. All four test doughs behaved similarly during mixing giving well developed, extensible doughs that handled well throughout the mechanical manipulations of the modern, automated high speed bread line.

Bread firmness was measured by the Universal Testing Machine (Instron) Method as described in the AACC method 74-09. The results are shown in FIGURE 1. Two loaves each of Tests 1 through 4 were tested on days 1, 4, 6 and 8 after baking. For testing the ends of the loaf (2 inches) were discarded and a minimum of six, 1 inch slices distributed evenly throughout the loaf center were tested using a 25% (0.25 inch) compression. In addition, the center slice height was recorded and a subjective evaluation of eating quality was made on each of the test dates. Residual crumb moisture was determined in each of the samples by daying a preweighed portion of the crumb to a constant weight at 185° F. An analysis of variances (ANOVA) was used to determine whether each of the test results was statistically significant.

Over 8 days of storage, the average compression values for Test 3 were significantly lower (bread was softer) than those for the other formulations tested. Average compression values for Test "4", over the same storage period were significantly higher (bread was firmer) than those for the other formulations tested. Test 1 showed lower average compression values than Test 2 over 8 days of storage. Overall slicing was clean without piling for all formulations tested. The chewdown (time to masticate the bread, an indication of eating quality) was moderately fast (indicating that the crumb was not gummy) for all formulations tested.

Average percent standard deviation for compression values of 12 slices per 2 loaves was 4% for Tests 1 and 2, 6% for Test 3, and 5% for Test 4, indicating even crumb properties both within and between loaves.

Crumb moisture contents of the loaves of Day 1 was 42.9% for Test 1, 42.4% for Test 2, 43.8% for Test 3, and 42.3% for Test 4.

Average center slice heights for all Tests were the same at 4.25 inches.

In summary, incorporation of Ultracel, a structurally expanded form of cellulose, at a level of only 1 oz/cut of flour (620 ppm) allowed incorporation of 2.3% more absorption or an increase in yield of over 25 lb for the 1100 lb flour weight batch. The incorporation of the additional moisture is preserved throughout the baking process as indicated by the 1.5% moisture increase in the finished bread product containing Ultracel versus the control. The impact of the increased moisture is reflected in additional softness of the baked product and a reduction in the staling rate. The combined effect of increased yield and abatement of the staling phenomenon have important economic consequences to the baking industry.

What is claimed is:

1. A process for preparing a baked comestible characterized by improved softness and reduced staling, said process comprising:

i) providing a dough formulation including an effective amount of structurally expanded cellulose to increase water absorption, said amount being less than 0.25 weight percent based on the flour content of said dough; and ii) baking said dough formulation to produce said baked comestible.

2. A process as claimed in claim 1, wherein said structurally expanded cellulose is included in said dough formulation in an amount of from about 0.05 to about 0.1 weight percent, based on the weight of flour in said dough formulation.

3. A baked comestible produced by the process of claim 1.

4. A baked comestible prepared from dough and comprising an amount of structurally expanded cellulose effective to increase water absorption, said amount being less than 0.25 weight percent based on the flour content of said dough.

5. A baked comestible as claimed in claim 4, wherein said structurally expanded cellulose is present in an amount of from about 0.05 to about 0.1 weight percent, based on the flour content of said dough.

* * * * *